Oct. 20, 1931.     H. D. BOLTON     1,827,778
THERMOMETER
Filed Jan. 4, 1930
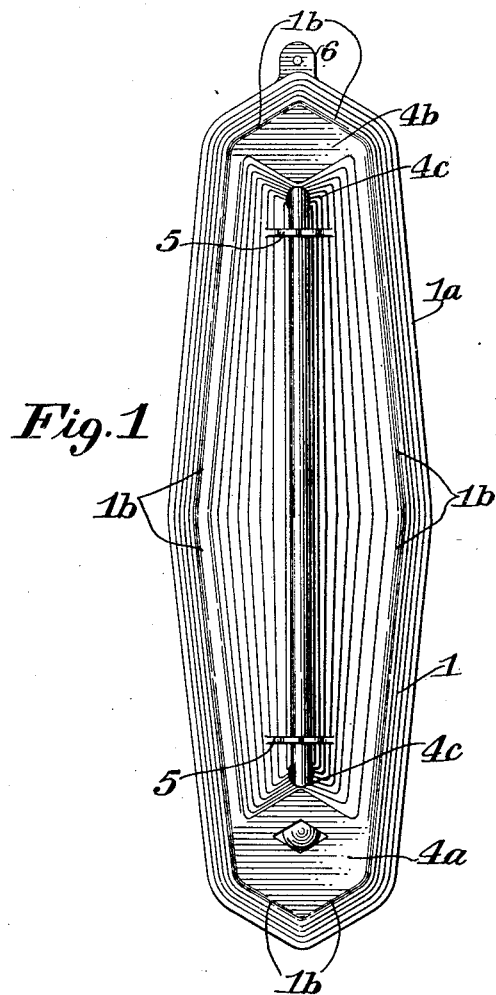
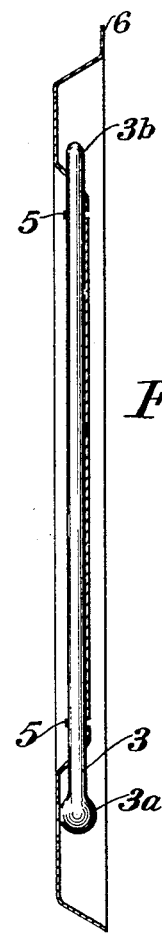
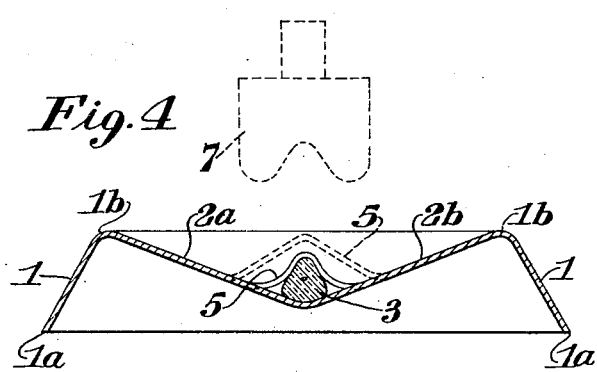
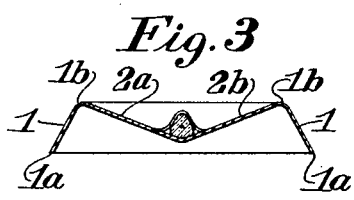
INVENTOR
Harry D. Bolton
BY
ATTORNEY Patented Oct. 20, 1931

1,827,778

UNITED STATES PATENT OFFICE

HARRY D. BOLTON, OF ROCHESTER, NEW YORK, ASSIGNOR TO TAYLOR INSTRUMENT COMPANIES, OF ROCHESTER, NEW YORK, A CORPORATION OF NEW YORK

THERMOMETER

Application filed January 4, 1930. Serial No. 418,533.

This invention relates to thermometers and more in particular to a thermometer casing and means for mounting the thermometer tube thereon.

The object of the invention is a thermometer exceedingly simple of construction and cheap to manufacture.

A more special object of the invention is a construction wherein the casing and the means for mounting the thermometer tube thereon consist of one single integral structure.

Another special object is a construction wherein the casing and all the usual parts for mounting and protecting the thermometer tube consist of a single integral structure.

The most specific object of the invention is a novel means for securing a thermometer tube to its casing or base, as the case may be.

For a full understanding of the invention and its characteristic features, reference is made to the accompanying drawings, wherein Fig. 1 is a face view of a thermometer assembly, the scale being omitted to simplify the illustration;

Fig. 2 is a central lengthwise section thereof;

Fig. 3 is a central transverse section thereof; and

Fig. 4 is an enlarged view indicating a step in the manufacture.

Having reference to the drawings, the casing or base consists of sheet metal formed to define a peripheral portion 1 the free edge 1a of which lies entirely in one plane and the inner edge 1b of which terminates entirely in another plane, a central portion composed of the faces 2a and 2b sloping from the lateral edges 1b toward the center to form a depression or trough to glass tube 3, and two flat portions 4a and 4b substantially in the plane of the edges 1b between the edges 1b and the opposite ends of the trough.

The peripheral portion 1 and the faces 2a and 2b, respectively, are so disposed relatively to each other as to provide ample room for the tube 3 between the plane of the edges 1a and the plane of the edges 1b so that the tube is protected against contact with other objects during shipment and in handling. The stem of the tube 3 lies mainly against the bottom of the trough while the opposite ends 3a and 3b of the tube including the bulb, extend through openings 4c of the end walls of the trough into the spaces behind the flat portions 4a and 4b, respectively. The latter thus are in effect guards for the bulb and the other end of the stem while the remaining part of the stem is sunk into the trough and thus protected against injury.

Near the opposite ends of the trough are provided straps 5 for holding the tube 3 in position.

The casing including a suspension lug 6 and the straps 5, is made of a single integral structure pressed out of sheet metal. It is first pressed into the form described. Then the straps 5 are formed by making incisions and forcing out the isolated strips as indicated in dotted line in Fig. 4. Then the tube 3 is put in place and the straps 5 are pressed down by means of a tool 7 to frictionally hold the tube.

The straps are so formed, having regard to the length of the incisions or the position of the fixed ends of the straps and the shape of the tool 7 that as the straps approach the tube, they snap into holding contact when they pass what may be called a dead center position. While the straps thus disposed remain normally in their position, I prefer to make their position more secure by applying a small quantity of a suitable cement to prevent the straps from being jarred or otherwise moved out of their snap-action position. The principal function of the straps is to hold the tube 3 against lengthwise motion.

I claim:

1. In a thermometer, the combination with a thermometer tube, of a base of sheet metal shaped to define a trough and means for securing the tube at the bottom of the trough, comprising a strap of the material struck up from the metal of the base and so formed as to resiliently bear against the tube.

2. In a thermometer, the combination with a thermometer tube, of a base of sheet metal shaped to define a trough and means for securing the tube at the bottom of the trough, comprising a strap struck up from the metal of the base at the bottom of the trough and integrally connected with the base at both ends.

3. In a thermometer, the combination with a thermometer tube, of a base of sheet metal shaped to define a trough, and means for securing the tube at the bottom of the trough, comprising a strap struck up from the metal of the base at the bottom of the trough, the strap being integrally connected with the base at both ends and being formed to spring into securing position with a snap action.

4. In a thermometer, the combination with a thermometer tube, of a base of sheet metal shaped to define a substantially V-shaped trough, and means for securing the tube in the trough, comprising a strap struck up from the metal of the base and integrally connected with the walls of the trough at both ends and at points materially above the bottom of the trough, the strap being so formed as to spring into securing position with a snap action.

In testimony whereof I affix my signature.

HARRY D. BOLTON.